United States Patent
Fonseca, Jr. et al.

(10) Patent No.: US 9,854,202 B2
(45) Date of Patent: Dec. 26, 2017

(54) PROCESSING SEGMENTS OF CLOSED-CAPTION TEXT USING EXTERNAL SOURCES

(71) Applicant: ARRIS Enterprises, Inc., Suwanee, GA (US)

(72) Inventors: Benedito J. Fonseca, Jr., Glen Ellyn, IL (US); Anthony J. Braskich, Palatine, IL (US); Faisal Ishtiaq, Chicago, IL (US); Alfonso Martinez Smith, Algonquin, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/568,096

(22) Filed: Dec. 11, 2014

(65) Prior Publication Data
US 2016/0173814 A1     Jun. 16, 2016

(51) Int. Cl.
*H04N 7/00* (2011.01)
*H04N 11/00* (2006.01)
(Continued)

(52) U.S. Cl.
CPC ..... *H04N 7/0882* (2013.01); *G06F 17/30796* (2013.01); *H04N 21/435* (2013.01);
(Continued)

(58) Field of Classification Search
CPC .. H04N 7/0882; H04N 7/0884; H04N 7/0885; H04N 21/435; H04N 21/4622;
(Continued)

(56) References Cited

U.S. PATENT DOCUMENTS 8,176,068 B2    5/2012  Kunjithapatham et al.
8,484,313 B2    7/2013  Hines
(Continued)

OTHER PUBLICATIONS

M. Dowman, et al., "Semantically Enhanced Television News Through Web and Video Integration", Second European Semantic Web Conference, May 2005, pp. 1-8.
(Continued)

*Primary Examiner* — Michael Lee
(74) *Attorney, Agent, or Firm* — Stewart M. Wiener (57) ABSTRACT

Particular embodiments provide supplemental content that may be related to video content that a user is watching. A segment of closed-caption text from closed-captions for the video content is determined. A first set of information from the segment of closed-caption text, such as terms may be extracted. Particular embodiments use an external source that can be determined from a set of external sources. To determine the supplemental content, particular embodiments may extract a second set of information from the external source. Because the external source may be more robust and include more text than the segment of closed-caption text, the second set of information may include terms that better represent the segment of closed-caption text. Particular embodiments thus use the second set of information to determine supplemental content for the video content, and can provide the supplemental content to a user watching the video content.

20 Claims, 9 Drawing Sheets

(51) Int. Cl.
  *H04N 7/088* (2006.01)
  *H04N 21/435* (2011.01)
  *H04N 21/462* (2011.01)
  *H04N 21/4722* (2011.01)
  *H04N 21/488* (2011.01)
  *H04N 21/8405* (2011.01)
  *G06F 17/30* (2006.01)

(52) U.S. Cl.
  CPC ..... *H04N 21/4622* (2013.01); *H04N 21/4722* (2013.01); *H04N 21/4884* (2013.01); *H04N 21/8405* (2013.01)

(58) Field of Classification Search
  CPC ........... H04N 21/4722; H04N 21/4884; H04N 21/8405; G06F 17/30796
  USPC ......................................................... 348/468
  See application file for complete search history.

(56) References Cited

U.S. PATENT DOCUMENTS

| | | | | |
|---|---|---|---|---|
| 2002/0147984 | A1* | 10/2002 | Tomsen | H04N 5/4401 725/109 |
| 2004/0199502 | A1 | 10/2004 | Wong et al. | |
| 2008/0059522 | A1* | 3/2008 | Li | G06F 17/30793 |
| 2008/0208839 | A1* | 8/2008 | Sheshagiri | G06F 17/30796 |
| 2008/0266449 | A1* | 10/2008 | Rathod | G06F 17/30796 348/468 |
| 2009/0138459 | A1* | 5/2009 | Walter | G06F 17/30828 |
| 2009/0164460 | A1 | 6/2009 | Jung et al. | |
| 2010/0121936 | A1 | 5/2010 | Liu et al. | |
| 2010/0161580 | A1* | 6/2010 | Chipman | G06F 17/3053 707/706 |
| 2013/0300929 | A1 | 11/2013 | Hlnes | |
| 2014/0337308 | A1 | 11/2014 | De Francisci et al. | |

OTHER PUBLICATIONS

PCT Search Report & Written Opinion, Re: Application No. PCT/US2015/065189, dated Mar. 24, 2016.

A. Messer, et al., "SeeNSearch: A context directed search facilitator for home entertainment devices" Pervasive and Mobile Computing, vol. 4, No. 6, Dec. 1, 2008, pp. 871-888.

* cited by examiner

SEGMENT OF CLOSED-CAPTION TEXT *802*

"<ANNOUNCER #1,>: MORE THAN TWO MILLION REFUGEES, <REFUGEE NAME>.
ALONG THE OO WITH COUNTRIES>.
<REFUGEE NAME>, THANK YOU.
    TODAY, TWO PEOPLE WERE INJURED IN ANTIGOVERNMENT PROTESTS IN UKRAINE.
    THE PROTEST STARTED TWO MONTHS AGO BASED ON AN ECONOMIC ISSUE.

EXTERNAL SOURCE *804*

TITLE: UKRAINE: CLASHES RAGE ON BETWEEN PROTESTORS, POLICE IN KIEV

LARGE AMOUNT OF TEXT

*FIG. 8*

SEGMENT OF CLOSED-CAPTION TEXT
902

"GONE THROUGH REHAB. ANYTHING YOU WANT TO SHARE ABOUT THAT? JUST THAT I'M IN THE BEST PLACE I'VE BEEN.
    >>> NEW FALLOUT FROM <ACTOR #2> ALLEGED ASSAULT ON A TEEN WHO HURLED RACIAL SLURS AGAINST HIS FIANCEE <ACTOR #1>. THE 18-YEAR-OLD REPORTEDLY WILL SETTLE FOR SAME AMOUNT.
    ENJOYING SOME SHOPPING IF <ACTOR #1> IS WORRIED, SHE'S NOT SHOWING IT. NEWS VIDEO <ACTOR #1>

EXTERNAL SOURCE
904

TITLE: ACTOR #1, ACTOR #2 PLANNING SUMMER WEDDING IN PARIS

LARGE AMOUNT OF TEXT

*FIG. 9*

SEGMENT OF CLOSED-CAPTION TEXT *1002*

"THE CURRY BASKETBALL BOMBSHELL.
IT WAS ONE WEEK AGO THAT KERRY WON THE SCHOOL'S FIRST EVER CHAMPIONSHIP.
KERRY WAS FORFEITED ALL VICTORIES AFTER
SOME PLAYERS WERE FOUND ACADEMICALLY INELIGIBLE. IT CAME UP BEFORE THEY FACED"

EXTERNAL SOURCE *1004*

TITLE: CURIE SUPPORTERS RALLY FOR PUBLIC LEAGUE TITLE REINSTATEMENT

LARGE AMOUNT OF TEXT

*FIG. 10*

PROCESSING SEGMENTS OF CLOSED-CAPTION TEXT USING EXTERNAL SOURCES

BACKGROUND

While a user watches video content, such as through a television broadcast or video on demand, opportunities exist to supplement the user experience while the user watches the video content. For example, related content to the television program being watched by a user may be displayed on the same screen (e.g., television). In one example, a user is watching a newscast and the newscaster mentions a brief story about a person or a country and related content about the person or country is also shown in the screen. In another example, a user is watching a program about an automobile mechanic and an advertisement for automobiles is also shown on the screen as related content. Also, second screen opportunities exist where the related content, Internet links to the related content, or advertisements can be displayed on a second screen, such as a tablet device or smartphone being used by a user.

The related content could be inserted by the content producer or the advertisement could be inserted by a sponsor. In these cases, the content producer or sponsor would have to manually insert the related content or advertisement. This manual insertion procedure could be time consuming and expensive.

DETAILED DESCRIPTION

Described herein are techniques for a system to provide supplemental content to a user. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide supplemental content that may be related to video content that a user is watching, will watch, or has watched. In one embodiment, a segment of closed-caption text from closed-captions for the video content is determined. The segment may be a portion of the entire closed-caption text for the video content, such as 30 seconds of closed-caption text. Terms that form a first set of information from the segment of closed-caption text may be extracted. In one embodiment, this first set of information may be words or sets of words, which may be referred to as key terms or named entities. In another embodiment, this first set of information may be shortened words, portions of words, sets of shortened words, or sets of portions of words extracted based on the segment of closed-caption text. Because the segment of closed-caption text is short and sometimes contains typographical errors, the extracted first set of information may not be the most efficient way to determine supplemental content. Particular embodiments use an external source that can be determined from a set of external sources. For example, an external source may be a Really Simple Syndication (RSS) feed or other content that includes text longer than the amount of text found in the segment of closed-caption text.

To determine the supplemental content, particular embodiments may extract a second set of terms from the external source. In one embodiment, this second set of terms may be words or sets of words, which may be referred to as key terms or named entities. In another embodiment, this second set of terms may be shortened words, portions of words, sets of shortened words, or sets of portions of words extracted based on the external source. Because the external source may include more text and contain less typographical errors than the segment of closed-caption text, the second set of terms may include terms that better represent the segment of closed-caption text. Particular embodiments thus use the second set of terms as a second set of information to determine supplemental content for the video content, and can provide the supplemental content to a user watching the video content. In other embodiments, an identifier for the external source is provided to the user as the supplemental content.

System Overview

Figure 1:
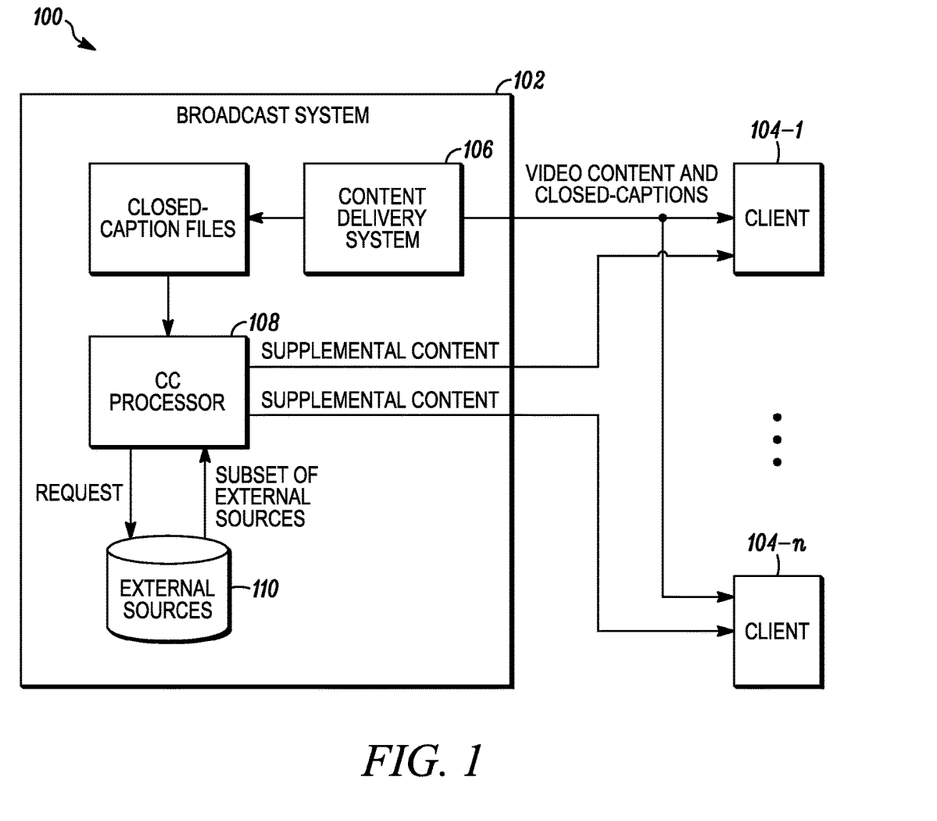
FIG. 1 depicts an example system for providing supplemental content according to one embodiment.

FIG. 1 depicts an example system 100 for providing supplemental content according to one embodiment. A broadcast system 102 delivers video content to client devices 104-1-104-n. Broadcast system 102 may be any system that can deliver video content, such as a television broadcast system and/or a streaming video system. A television broadcast system may deliver video content through a set schedule. A streaming video system may deliver video content on demand based on requests from client devices 104.

Client devices 104 may include televisions, mobile devices such as smartphones and tablet devices, personal computers, and other devices that can receive video content and display the video content. Also, client devices 104 may include receivers that can receive the video content, such as set top boxes.

As shown, a content delivery system 106 delivers video content to client devices 104-1-104-n. Content delivery system 106 may include components included in various cable television delivery systems or streaming video systems. Also, content delivery system 106 may deliver closed-captions with the video content. Closed-captions may be information that typically displays a transcription of the spoken dialogue of the associated video content, and may also include potential typographical errors. The closed-captions may also include other information in addition to the spoken dialogue, such as the identity of speakers or what is happening in a scene of the video content. Clients 104 may selectively choose to display the closed-captions. However, particular embodiments may be used whether or not a user displays the closed-captions.

Each video content may be associated with a collection of closed-captions. This collection of closed-captions may originate from a computer file; may originate from a stream of closed captions; or may originate from other processes. This collection of closed-captions may also contain all of the closed captions from the video content or may contain only a subset of the closed captions from the video content. For example, the company that distributed the video content, such as a television program, may also provide a collection of closed-captions that includes closed-caption text for the program. Also, during live broadcasts or real-time broadcasts (e.g., newscasts), the collection of closed-captions may be created in real-time as the video content is being sent to the user (or slightly before). In this case, voice recognition may be used to generate the closed-captions, and typographic errors may occur. Although closed-captions are described, multimedia information may be used instead of closed-captions or in addition to closed-captions. The multimedia information includes objects recognized within the video content, speech or sounds in the video content, or metadata from the video content.

A closed-caption (CC) processor 108 processes the collection of closed-captions to determine supplemental content for the video content. Details of the determination of the supplemental content will be described in more detail below. CC processor 108 can then send the supplemental content to client devices 104. For example, the supplemental content may be sent to the same client device on which a user is watching the video content. In other embodiments, CC processor 108 may send the supplemental content to another device, such as a second screen device, associated with the user and/or client device 104.

Particular embodiments improve the functioning of broadcast system 102 by including CC processor 108 within the video delivery process. CC processor 108 can provide supplemental content to enhance the viewing experience of a user that is watching video associated with the segment of closed-caption text. Further, by operating CC processor 108 as an automatic process, the supplemental content can be delivered in real-time while the user is watching the video content. During real-time or near real-time broadcasts, CC processor 108 can determine supplemental content efficiently and deliver the supplemental content in a time near when the video content associated with the segment of closed-caption text is displayed.

To determine the supplemental content, CC processor 108 may take segments of closed-caption text from a collection of closed-captions to determine the supplemental content. For this, CC processor 108 may perform a series of steps for each segment of the closed-caption text. At a first step, the CC processor 108 extracts terms that form a first set of information from the closed-caption text. At a second step, the CC processor 108 requests a subset of external sources from storage 110. At a third step, the CC processor 108 selects an external source from the subset of the external sources based on a similarity analysis and determines terms that form a second set of information from the selected external source. At a fourth step, the CC processor may perform a search, such as an Internet search, for related content using the second set of information.

In the first step, the CC processor 108 executes an extraction algorithm on the segment of the closed-caption text. This extraction algorithm extracts "terms" from the segment of the closed-caption text. These terms may be key terms or named entities from the text that are determined to represent the text. Key terms may be terms that are considered important and named entities are terms that fall within predetermined categories of names (e.g., people's names, location names, organization names, etc.). Each "term" can be one of the following: a single word; a shortened word, e.g., a subset of letters of a word; or a set containing two or more words or shortened words. For instance, the set of words "New York" may represent a single term. Likewise, the set of words "car chase" may represent a single term. The set of extracted terms by the CC processor 108 forms the first set of information.

In the second step, the CC processor 108 requests a subset of external sources from storage 110. In one example, the subset of external sources requested is determined based on a restriction on either the external source, the video content or both, such as a time-based restriction. For example, external sources may be determined that are associated with a date range, such as a date range around the date/time of a video content, such as news feeds that were created within one day of when the video content originally aired. Other restrictions may also be used, such as subject-based restrictions including a genre (e.g., news, comedy, cars) associated with the external source and/or video content, or metadata for the video content. For instance, if the video content is of genre "Sports", then just external content from the genre "Sports" would be selected for the subset.

At the third step, CC processor 108 selects one external source (or a subset) from the subset based on a similarity analysis. To perform such a selection, the CC processor 108 executes an extraction algorithm, such as the same one that was executed on the segment of the closed-caption text to determine the first set of information in the first step, on each external source in the subset of external sources. This extraction algorithm extracts "terms" from the text within each of the external sources. As previously explained, each "term" can be one of the following: a single word; a shortened word; i.e., a subset of letters of a word; or a set containing two or more words or shortened words.

Still at the third step, the CC processor 108 compares the terms that form the first set of information with the terms extracted from each of the external sources. Such a comparison produces a similarity metric between the first set of information and each one of the set of terms. The CC processor 108 selects the external source whose extracted terms produced the highest similarity metric. The CC processor 108 then uses such terms as the second set of information. Further, other information may be extracted for the second set of information, such as objects from the video content, speech, etc. Because the external sources may be longer or include more text than the segment of closed-caption text, the extraction algorithm may extract terms from the external sources that may more accurately represent the segment of closed-caption text. For example, CC processor 108 may extract more accurate key terms or named entities, or extract different key terms and named entities that are not included in the first set of information.

In one embodiment, at the fourth step, the CC processor 108 uses the second set of information to determine the supplemental content. For example, CC processor 108 does not use the first set of information in determining the supplemental content. In this case, it is expected that the second set of information may be more relevant to the segment of closed-caption text than the first set of information. However, since the first set of information may be used to determine which external source within the subset of external sources is most similar to the segment of closed-caption text, the first set of information indirectly has an effect on which supplemental content is determined. In other embodiments, the second set of information is used in addition to the first set of information to determine the supplemental content.

In this case, the terms of the first set of information supplement the second set of information. To determine the supplemental content, CC processor 108 may perform an Internet search using the second set of information to determine the supplemental content. For example, the search is performed using key terms or named entities extracted from the external source. CC processor 108 provides the results of the search to client device 104.

In another embodiment, the supplemental content may be provided in the form of an identifier for one of the external sources. In this case, CC processor 108 may use the first set of information to determine which external source within the subset of external sources is most similar to the segment of closed-caption text. For example, CC processor 108 compares the first set of information to the second set of information to determine the most similar (e.g., or group of most similar) external sources. The identifier (e.g., link) to the external source is then provided to client device 104 such that it can be retrieved.

CC Processor 108

Figure 2:
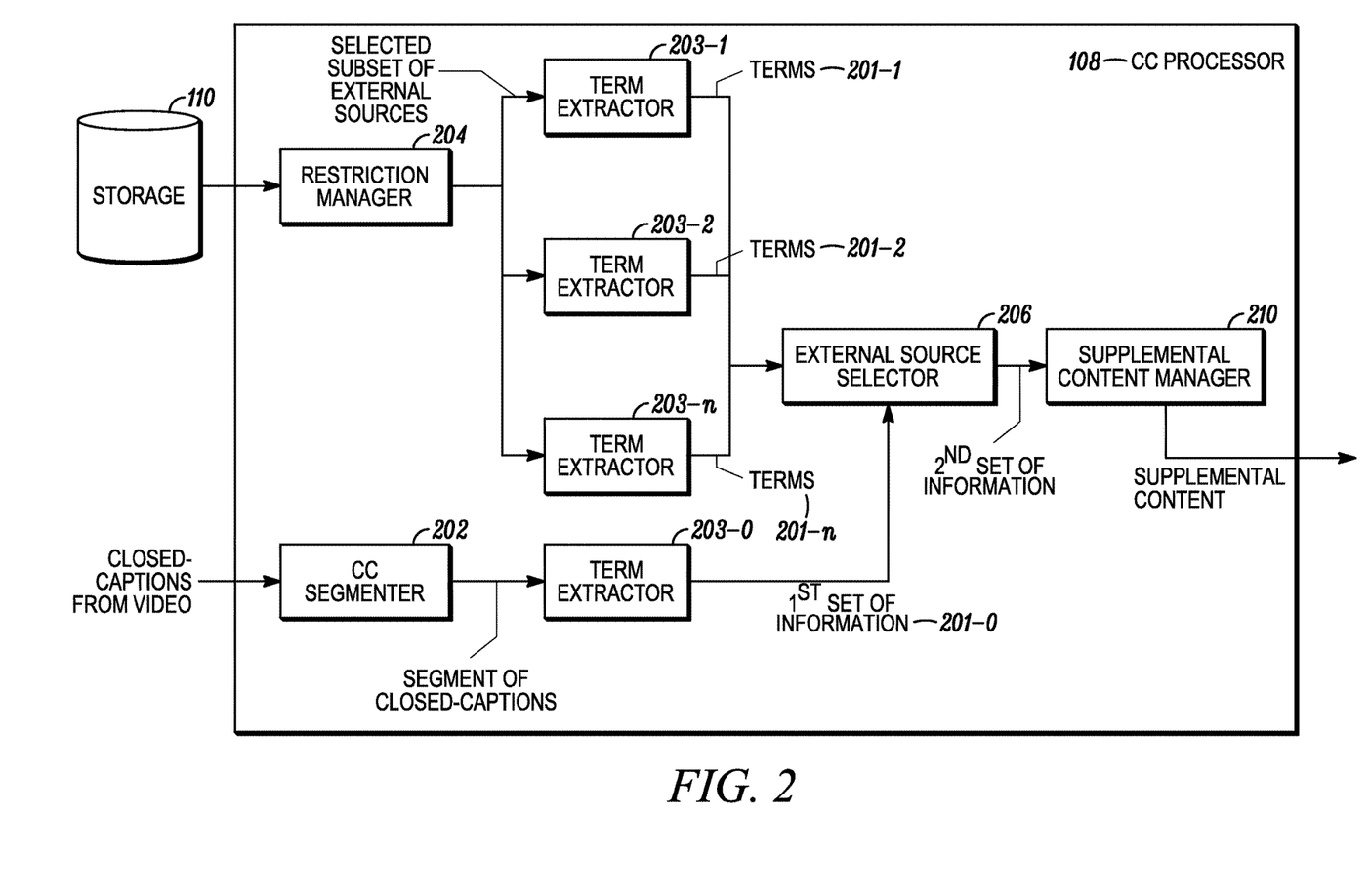
FIG. 2 depicts a more detailed example of closed-caption (CC) processor according to one embodiment.

FIG. 2 depicts a more detailed example of CC processor 108 according to one embodiment. CC processor 108 includes a CC segment processor 202 that receives the collection of closed-captions. The collection of closed-captions may be a complete collection for the entire video content. However, CC processor 108 may only process segments of the complete collection. In other examples, segments of the closed-captions may be received as they are generated for the video content. In one example, a 30-second segment (other durations may also be used) from the collection of closed-captions may be processed by CC segment processor 202. This 30-second segment may correspond to a segment of video content that is currently being played on client device 104, may already have been played by client 104, or may be played in the future.

A segment may be used instead of the whole collection of closed-captions to focus the search for supplemental content regarding a specific time period in the video. If the entire collection of closed-captions were searched to extract terms, it could yield inaccurate results. For example, in a newscast, many different topics may be discussed. If the entire collection of closed-captions is used, then it would be hard to focus supplemental content for each of the different topics. However, if 30-second segments are used, then supplemental content may be provided to a user contemporaneously when the associated topic is being displayed on client device 104.

Segment processor 202 segments the closed-caption text from the video and provides a segment to a Term Extractor 203-0. Term Extractor 203-0 extracts terms from the segment, forming the first set of information 201-0.

Although searching the entire database of external sources may be performed, it may not be efficient or yield timely results. A restriction manager 204 may determine a restriction that is used to determine a subset of external sources in storage 110. Restricting the search to a subset of the external sources may yield more relevant external sources. In one embodiment, restriction manager 204 may extract a subset of external sources from storage 110 by a combination of one or more restrictions. For example, a time range may be used, such as only external sources generated within a few days from the date of generation of the segment of closed-caption text. The genre may be used, such as external sources generated in one or more genres related to the genre of the video content. The source of the external source may be used to select external sources generated from the same source that generated the closed-caption text (e.g., news sources). Other restrictions include the popularity, presence in social media, who owns or produces the content, or which users are subscribed to the content. In one example, the time period may be a time range, such as one day around when the video content originally aired. In this case, when the video content is a news segment, external sources from around the events covered in the newscast may provide better results for current events. In other cases, when a movie is from the 1980s, external sources from the 1980s may be used.

Restriction manager 204 sends the subset of external sources to the term extractors 203-1 to 203-n. Term Extractor 203-1 extracts terms 201-1 from the text from the first external source in the subset provided by the restriction manager 204. Likewise, term extractor 203-n extracts terms 201-n from the text from the n-th external resource in the subset provided. It will be understood that the term extraction may be performed in real-time or be performed previously with the terms stored for the external source.

External source selector 206 receives the terms extracted from the closed-caption text by term extractor 203-0, and receives the terms extracted from each of the external sources by the term extractors 203-1 to 203-n. External source selector 206 then computes one or more similarity metrics, one metric between first set of information 201-0 and terms 201-1; another metric between first set of information 201-0 and terms 201-2 and so on such that n similarity metrics are computed, one for each of the terms 201-1 to 201-n. The external source whose terms 201-n had the highest similarity metric with the terms of first set of information 201-0 is selected by the external source selector 206.

A supplemental content manager 210 may then perform an action associated with the second set of information determined by external source selector 206. In one embodiment, supplemental content manager 210 may use the second set of information to perform an Internet search for content. In one example, supplemental content manager 210 enters the second set of information into a search engine to determine the supplemental content. Supplemental content manager 210 can then send the supplemental content to a user.

In another embodiment, supplemental content manager 210 may provide an identifier to one or more external sources that are determined to be the most similar to a user. For example, supplemental content manager 210 provides a link for the most similar external sources to a user.

The following will describe in more detail the two different ways supplemental content manager 210 can provide different types of supplemental content to a user. Although these methods are described, other methods of providing supplemental content may also be appreciated.

Supplemental Content Search Example

Figure 3:
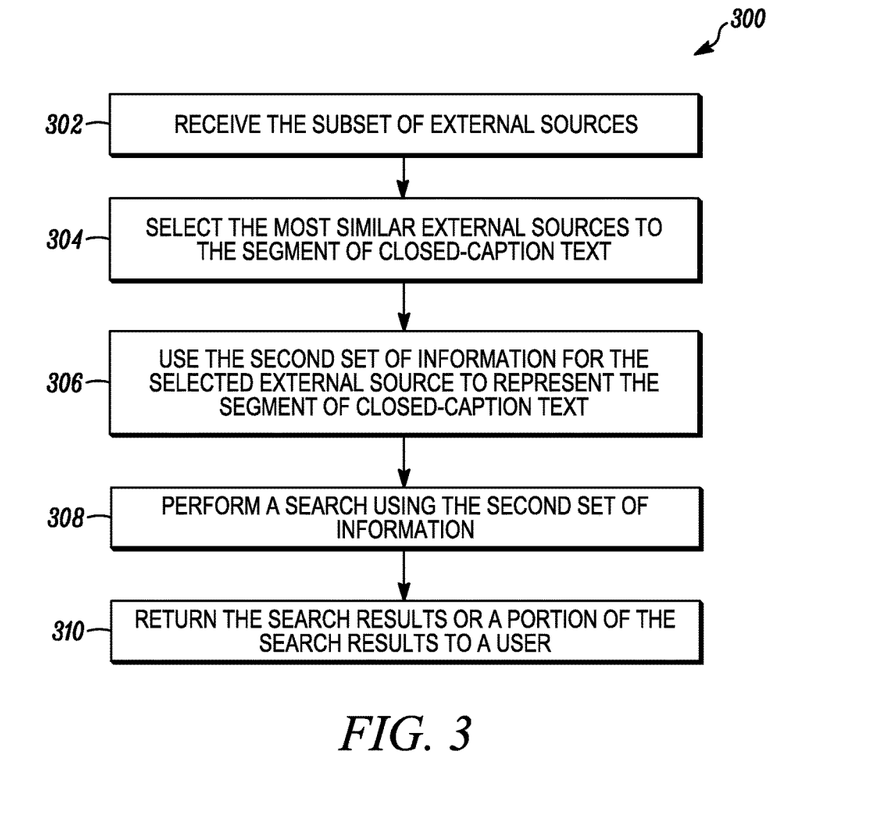
FIG. 3 depicts a simplified flowchart of a method for determining supplemental content related to the segment of closed-caption text using external sources according to one embodiment.

FIG. 3 depicts a simplified flowchart 300 of a method for determining supplemental content related to the segment of closed-caption text using external sources according to one embodiment. At 302, term extractors 203-1 to 203-*n* receive the subset of external sources. As discussed above, the subset of external sources may be determined based on a restriction. In another embodiment, all of the subset of external sources may be used to determine the supplemental content. However, it may be desirable to determine which external sources in the subset are most relevant to the segment of closed-caption text.

At 304, external source selector 206 selects the most similar external sources to the segment of closed-caption text based on the terms extracted in term extractors 203-1 to 203-*n* and also based on the terms extracted by term extractor 203-0 from the closed-caption segment in the first set of information 201-0. For discussion purposes, it is assumed a single external source is determined, but multiple external sources may be used.

As explained above, external source selector 206 selects the external source and determines the second set of information by comparing each of the received terms in the terms 201-1, . . . ,201-*n* against the terms in the first set of information 201-0 through a similarity algorithm. Particular embodiments may use different similarity algorithms. In one example, term extractor 203-0 runs an extraction algorithm to extract terms in the first set of information 201-0 from the segment of closed-caption text. The extraction algorithm may extract key terms and named entities from the segment of closed-caption text. Key terms or named entities may be extracted based on various algorithms that are known in the art, such as TFIDF (Term Frequency-Inverse Document Frequency) algorithms may be used. Term extractors 203-1 to 203-*n* run extraction algorithms for each of the subset of external sources. In one embodiment, the extraction algorithm is the same as the one used to extract the first set of information. External source selector 206 extracts a similarity metric between terms 201-1 and the first set of information 201-0 by using any function that maps the terms of terms 201-1 and the first set of information 201-0 into a set of real numbers. In one embodiment, this similarity metric is obtained by counting the number of terms in the set given by the intersection of terms 201-1 and the first set of information 201-0. After extracting the similarity metric between the first set of information 201-0 and each one of the terms 201-1 to 201-*n*, external source selector 206 selects the asset corresponding to the terms with highest similarity metric and uses these terms to form the second set of information.

After determining the most relevant external source, at 306, the supplemental content manager 210 uses the second set of information, extracted from the selected external source, to represent the segment of closed-caption text. For example, the second set of information includes extracted key terms and/or named entities from the selected external sources. The second set of information is then selected to represent the segment of closed-caption text instead of the first set of information. Also, the first set of information can also be integrated with the second set of information.

At 308, supplemental content manager 210 can perform a search using the second set of information. Supplemental content manager 210 inputs the second set of information into a search engine to determine search results. In one embodiment, the search may not include the first set of information. At 310, supplemental content manager 210 may return the search results or a portion of the search results to a user.

Providing Identifiers for the External Source

Figure 4:
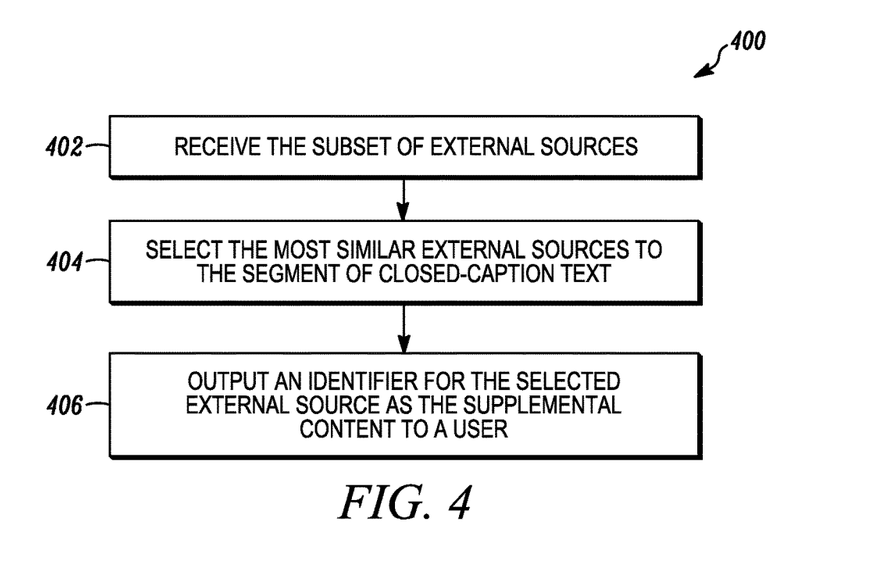
FIG. 4 depicts a simplified flowchart of a method for providing an identifier for an external source to a user according to one embodiment.

In the second example, an identifier for an external source is provided to a user instead of performing a search. FIG. 4 depicts a simplified flowchart 400 of a method for providing an identifier for an external source to a user according to one embodiment. At 402, term extractors 203-1 to 203-*n* receive the subset of external sources. At 404, external source selector 206 selects the most similar external sources to the segment of closed-caption text. For discussion purposes, it is assumed a single external source is determined, but multiple external sources may be used. As discussed above, external source selector 206 may compare the first set of information to the terms 201-1-201-*n* from external source.

At 406, supplemental content manager 210 then outputs an identifier for the selected external source as the supplemental content to a user. In the above method, supplemental content manager 210 did not use the second set of information from the external sources to do an Internet search for supplemental content. However, supplemental content manager 210 may have used the second set of information to determine which external source is most relevant to the segment of closed-caption text; e.g., content manager 210 may have used the second set of information to do a search for the external source within the database of external sources 110.

Similarity Analysis

Figure 5:
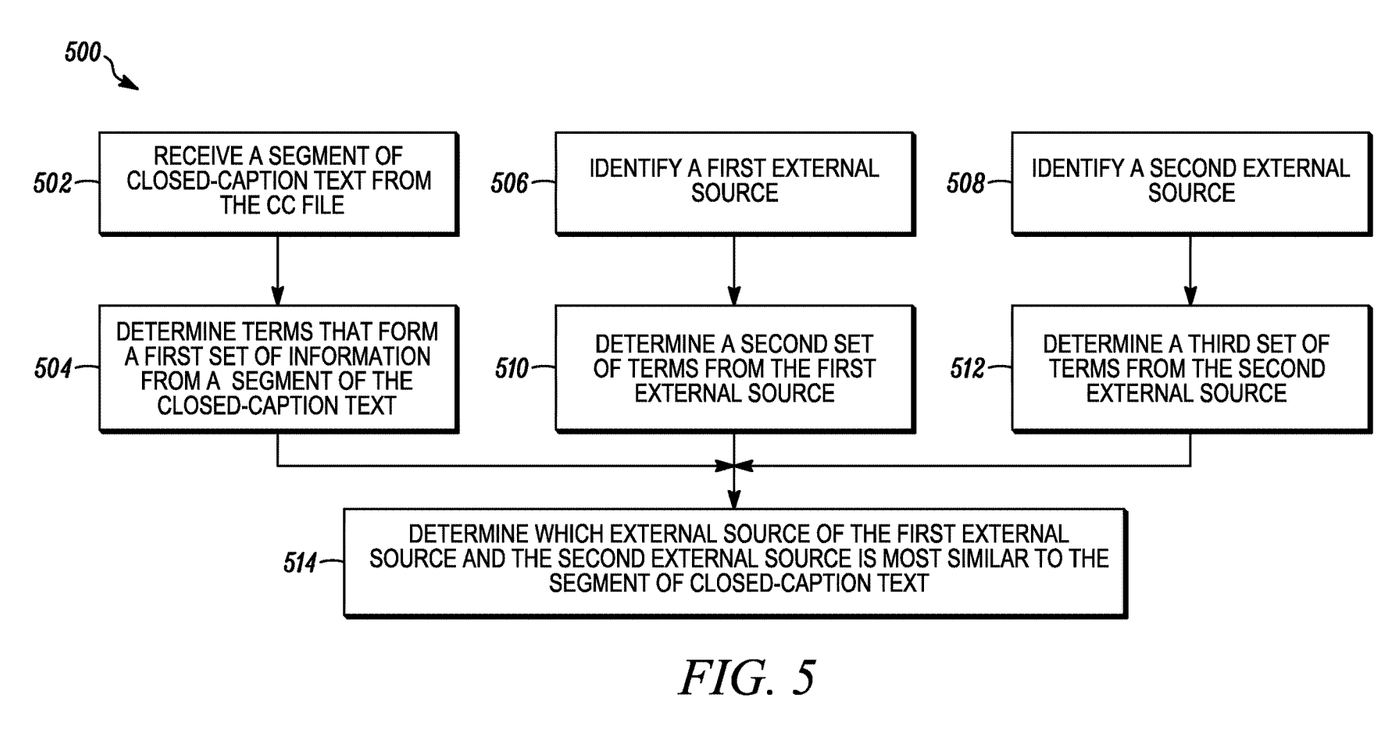
FIG. 5 depicts a more detailed example of a flowchart for performing a similarity analysis according to one embodiment.

As discussed above, particular embodiments perform a similarity analysis. FIG. 5 depicts a more detailed example of a flowchart 500 for performing a similarity analysis according to one embodiment. At 502, CC processor 108 receives a segment of closed-caption text from the collection of closed-captions. At 504, CC processor 108 determines terms that form a first set of information from a segment of the closed-caption text. This first set of information includes terms extracted from the segment. At 506, CC processor 108 identifies a first external source. Also, at 508, CC processor 108 identifies a second external source. The first and second external sources may be determined based on a restriction.

At 510, CC processor 108 determines a second set of terms from the first external source. The second set of terms includes terms that may be key words and named entities extracted using the same extraction algorithm used to extract terms from the segment of closed-caption text. At 512, CC processor 108 determines a third set of terms from the second external source. The third set of information may be determined in the same manner as the second set of terms using the extraction algorithm.

At 514, CC processor 108 determines which external source of the first external source and the second external source is most similar to the segment of closed-caption text. For example, a similarity analysis between the terms that form the first set of information and the terms that form the second set of terms, and the terms that form the first set of information and the terms that form the third set of terms is performed. Then, the terms of the second set of terms extracted from the most similar external source are used as the second set of information to determine supplemental content related to the segment of closed-caption text. Or, the identifier for the most similar external source is provided to a user.

In an alternative embodiment, CC processor 108 uses an internal database of common named entities to assign weights to each of the terms that form the first set of information, to each of the terms that form the second set of terms, and to each of the terms that form the third set of terms; and the similarity analysis is performed considering such weights. For instance, terms that are recognized to be named entities may be assigned a higher or lower weight than terms that are not recognized as named entities. Named entities represent any of the following: names of cities, names of famous persons, common person names, and names of organizations. In a further alternative embodiment, CC processor 108 uses an algorithm that analyzes the collection of closed-captions and the text within external sources to determine which terms represent named entities before performing the similarity analysis.

Extraction Algorithm Example

Particular embodiments may use an extraction algorithm that may extract terms, such as key terms and/or named entities. In one embodiment, the extraction algorithm uses a TFIDF algorithm, where "TF" is the term frequency or how often a word occurs in the text, and "IDF" is how rare a word is. The segments of closed-caption text are typically short, such as 30 seconds worth of text. Thus, the term frequency of any word is usually small within the segment of closed-caption text. This means that the TFIDF algorithm ends up relying on only the rarity of the words to extract the key terms and named entities. For example, the segment of closed-caption text may be "Boy in Washington gives speech to <President's Name>". Due to the length of this segment, the term frequency cannot be used by the TFIDF algorithm. However, the words "boy" and "speech" are less rare than the words "<President's Name>" and "Washington". If only the segment of closed-caption text is used, then the extracted key terms are "<President's Name>" and "Washington".

External sources, such as RSS feeds or other longer documents, may be longer and include more text than the segment of closed-caption text. This allows the TFIDF algorithm to operate more efficiently. The term frequency of important words is higher than the term frequency of less important words. For example, using the same segment as above, "Boy in Washington gives speech to <President's Name>", the external source that covers this story may mention "boy" and "speech" more than once and the TFIDF algorithm is able to identify key terms using the term frequency. For example, the TFIDF algorithm may identify the following key terms from the external source of "<President's Name>", "boy", "speech", "<name of boy>", "<name of school>". The "President's Name" may be the actual name of the President, the "Name of boy" and the "name of school" may be the respective name of the boy and then the location of the school in which the boy attends. These extracted terms from the external source may contain words that are not present in the segment of closed-caption text. The content determined from using the terms "<President's Name>" and "Washington" from the segment of closed-caption text may only provide stories related to government and legislative actions. However, including the other terms from the external source, more relevant supplemental content may be determined, such as when the boy gave a speech. Also, the extracted terms from the external source may even fix typographical errors in the segment of closed-caption text as will be described in examples below.

In another example, the segment of closed-caption text may be "<President's Name> invites the band Talking Heads to White House." If only the segment of closed-caption text is used, the TFIDF algorithm may extract the key terms of "<President's Name>" and "White House". However, the TFIDF algorithm does not recognize the term "Talking Heads" as being the name of a music band from the 1980's. But, external sources may indicate that "Talking Heads" is an important term and the TFIDF algorithm may be able to extract the term "Talking Heads" from the external source. The term "Talking Heads" is then used to determine the supplemental content. If only the segment of closed-caption text is used, then the terms "<President's Name>" and "White House" might provide stories related to the government. However, using the key term "Talking Heads", supplemental content related to when the President invited the band Talking Heads to the White House may be determined and provided.

Figure 6:
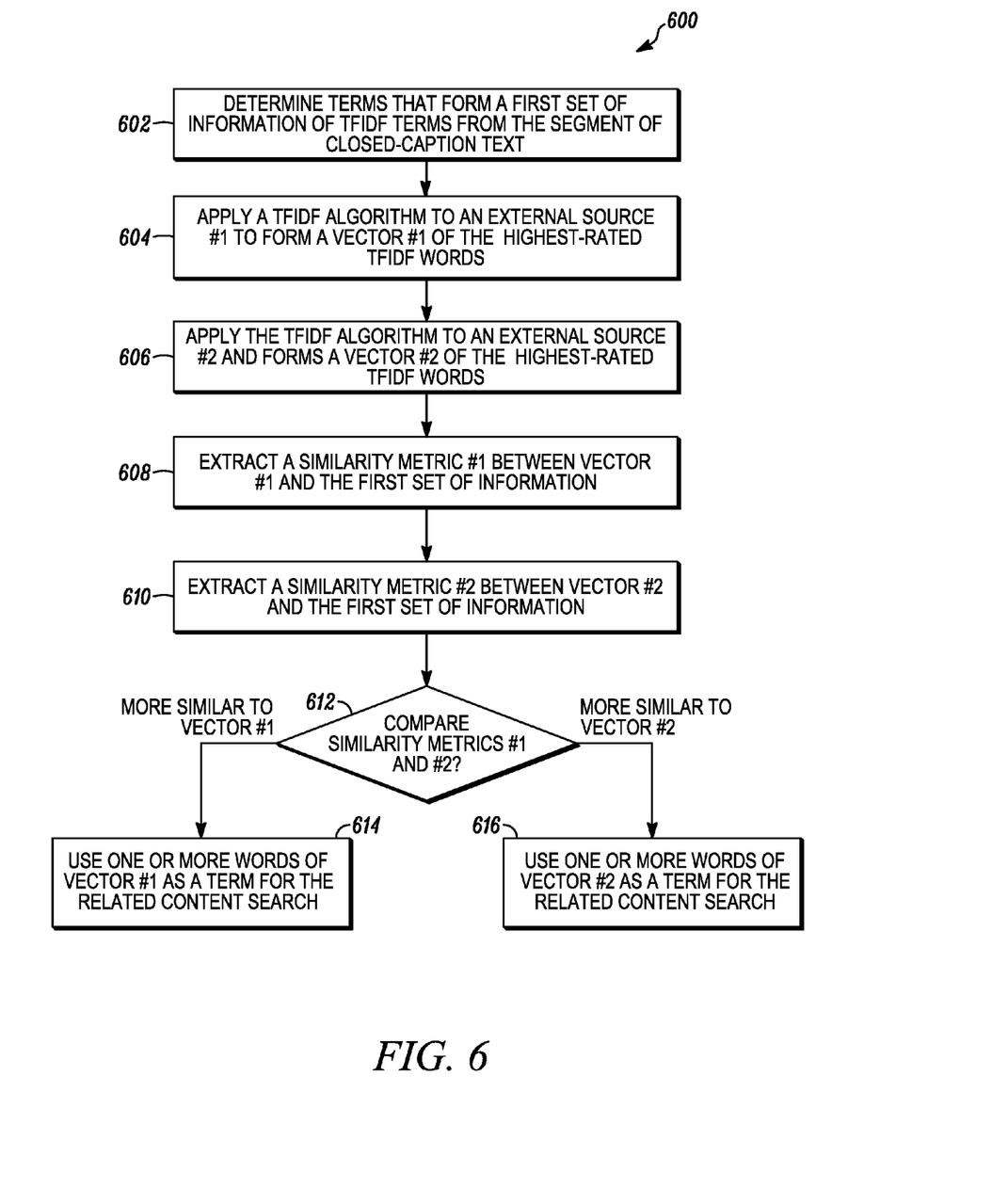
FIG. 6 depicts a simplified flowchart of a method for determining terms for a supplemental content search according to one embodiment.

The following describes in more detail the use of the TFIDF algorithm in performing different embodiments of determining supplemental content for a user. FIG. 6 depicts a simplified flowchart 600 of a method for determining terms for a supplemental content search according to one embodiment. At 602, CC processor 108 determines terms that form a first set of information of TFIDF terms from the segment of closed-caption text. At 604, CC processor 108 applies a TFIDF algorithm to an external source #1 to form a vector #1 of the highest-rated TFIDF words. This forms a second set of terms, associated with the first external source. At 606, CC processor 108 applies the TFIDF algorithm to an external source #2 and forms a vector #2 of the highest-rated TFIDF words. This forms a third set of terms, associated with the second external source.

At 608, CC processor 108 extracts a similarity metric #1 between vector #1 and the first set of information. Although the first set of information is used, the entire segment may be used to determine similarity. That is, instead of using terms extracted from the segment of closed-caption text, each word in the segment of closed-caption text is used. At 610, CC processor 108 then extracts a similarity metric #2 between vector #2 and the first set of information.

Different similarity metrics may be used. For example, a cosine difference between the TFIDF vector determined from the external source and a corresponding TFIDF vector from the segment of closed-caption text may be used to determine the similarity metric. In this example, the TFIDF vector corresponds to the TFIDF metric of each word in a set S1 of the most relevant words from the external source. Then the TFIDF vector of the segment of closed-caption text is formed by the TFIDF metric of each of the words in the first set of information as they occur in the segment of closed-caption text. Another similarity metric may use the number of words extracted from the segment of closed-caption text (or the number of words in the segment of closed-caption text) inside the second set of terms extracted from the external source. Another similarity metric may use the number of named entities extracted from the segment of closed-caption text inside the second set of terms extracted from the external source. Another similarity metric may use the number of non-named entities extracted from the segment of closed-caption text inside the second set of terms extracted from the external source. Another similarity metric may sum the number of named entities extracted from the segment of closed-caption text inside the second set of terms extracted from the external source; multiply the result by a multiplicative factor, forming a first intermediary result I1; then sum the number of non-named entities extracted from the segment of closed-caption text inside the second set of terms extracted from the external source; multiply the result by a different multiplicative factor, forming a second intermediary result I2; then reach the final similarity metric as the value of I1+I2.

Another similarity metric may be the Jensen-Shannon divergence between the empirical distribution of words from an external source and the distribution of corresponding words from the segment of closed-caption text. In this example, the empirical distribution is from words in a second set of terms of the most relevant words from the external source. Then the empirical distribution of the segment of closed-caption text is formed by the ratio of occurrences of each of the words in the second set of terms as they occur in the segment of closed-caption text.

Referring back to FIG. 6, at 612, CC processor 108 compares similarity metric #1 and similarity metric #2. When similarity metric #1 is more similar to the segment of closed-caption text, at 614, CC processor 108 uses one or more words of vector #1 as a term for the related content search. Also, when vector #2 is more similar to the segment of closed-caption text, at 616, CC processor 108 uses one or more words from vector #2 as a term for the related content search.

Figure 7:
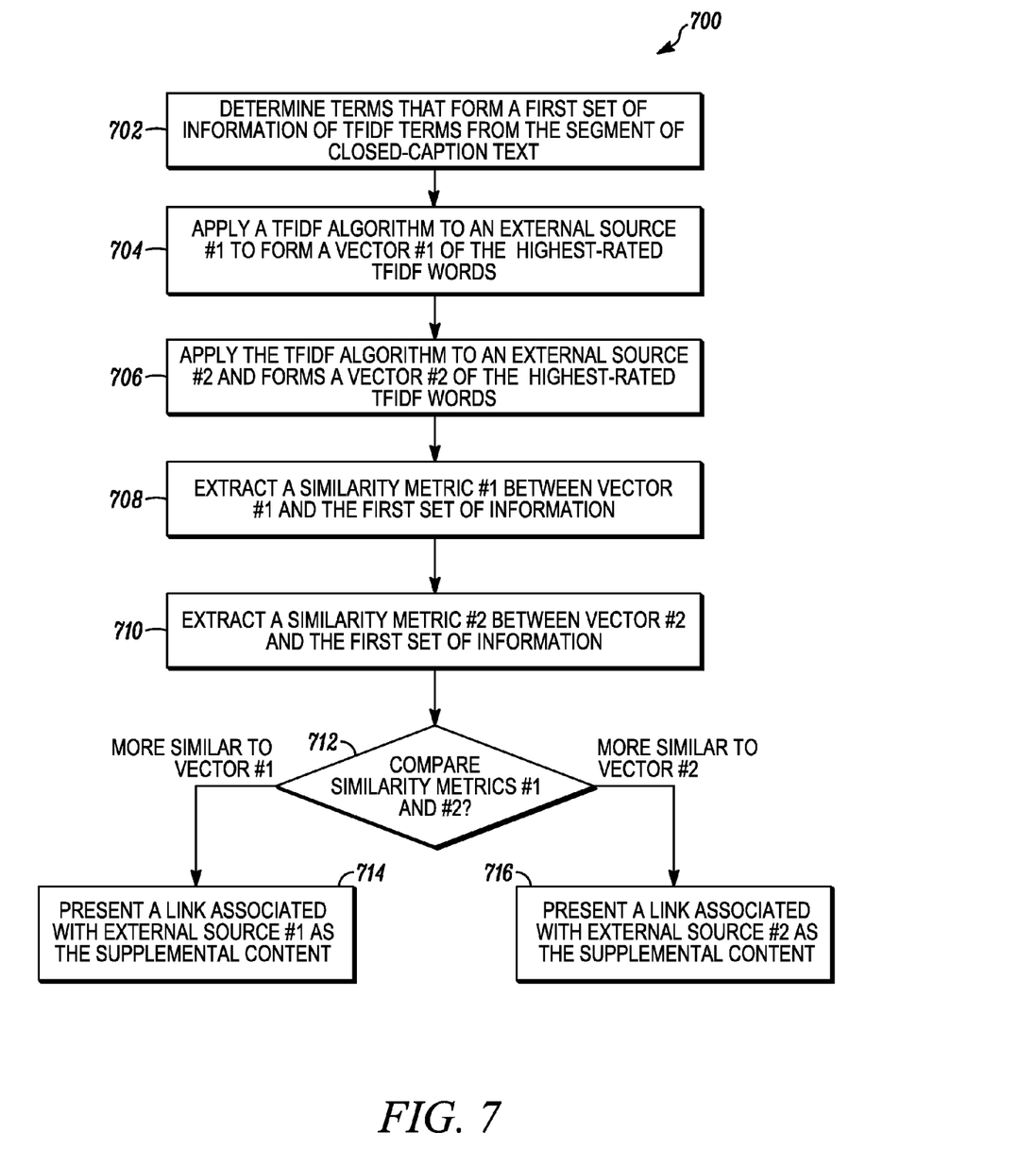
FIG. 7 depicts a simplified flowchart of a method for providing external sources to a user according to one embodiment.

FIG. 7 depicts a simplified flowchart 700 of a method for providing external sources to a user according to one embodiment. The steps 602-612 in FIG. 7 are similar to the corresponding steps in FIG. 6. However, when vector #1 is more similar to the segment of closed-caption text, at 714, CC processor 108 presents a link associated with external source #1 as the supplemental content. Also, when vector #2 is more similar to the segment of closed-caption text, CC processor 108 presents a link associated with external source #2 as the supplemental content.

EXAMPLES

Figure 8:
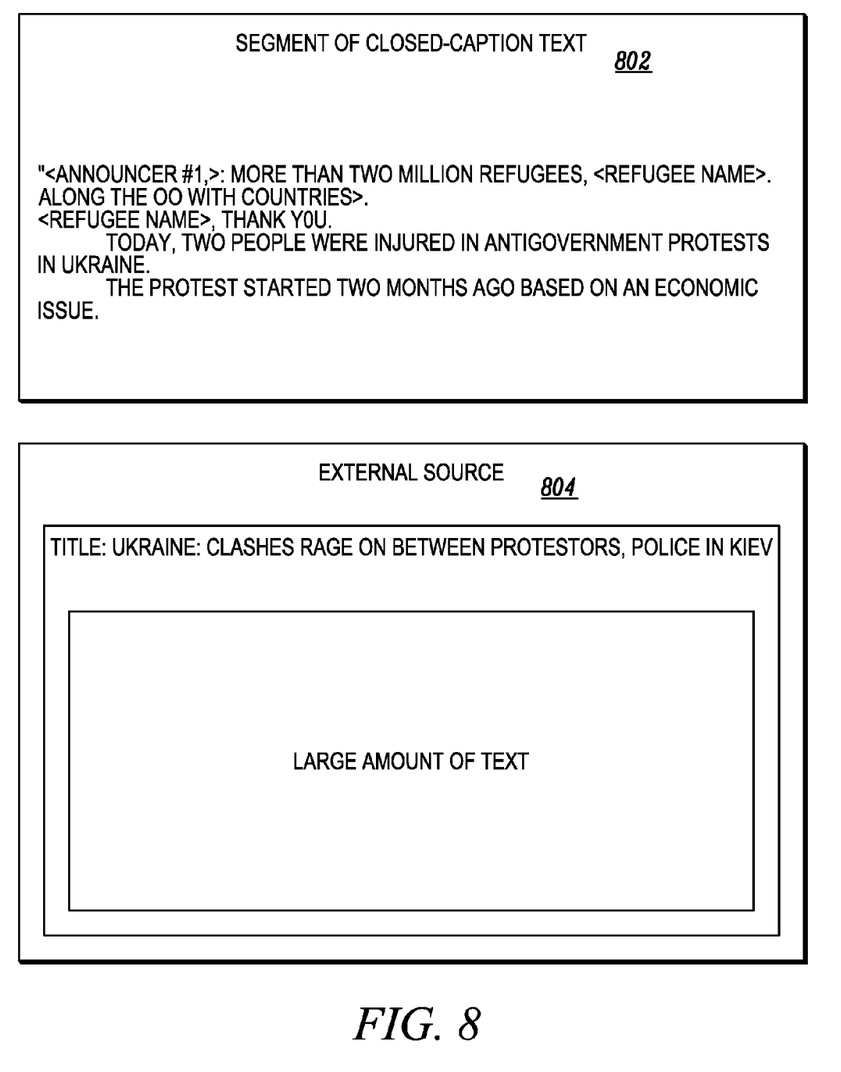
FIG. 8 shows an example of a segment of closed-caption text.

The following will now describe some examples that illustrate the generation of supplemental content according to one embodiment. FIG. 8 shows an example of a segment of closed-caption text at 802. For example, this may be a segment from a newscast. Announcer #1 may be the actual name of the newscaster and Refugee Name #1 is the actual name of the refugee. Running the extraction algorithm on the segment of closed-caption text may extract the terms "<Announcer #1>" and "<Refugee Name #1>" since these words are very rare compared to other words in the segment. However, these terms may not be useful to determine supplemental content. An external source of "Ukraine: Clashes rage on between protestors and police in Kiev" may be selected from a subset of external sources. This news article may have been released on the same day as the newscast thus making the news article mostly likely very relevant to a current event in the newscast. The external source may include more text than the segment of closed-caption text at 802. Thus, an extraction algorithm on the external source at 804 may yield better key terms, such as "Ukraine" and "Kiev".

Figure 9:
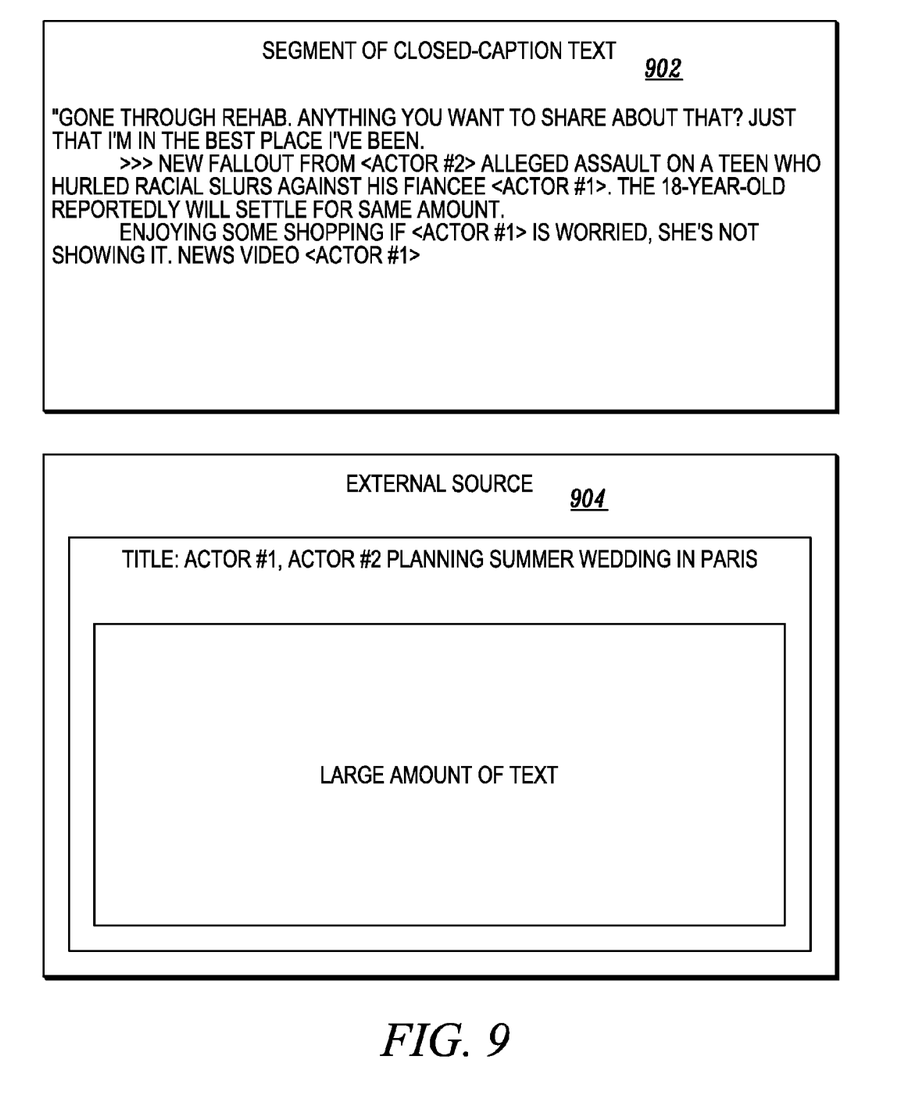
FIG. 9 depicts another example of a segment of closed-caption text.

FIG. 9 depicts an example of a segment of closed-caption text at 902. This may be a segment from a daily television show that originally aired on a first date. An external source at 904 may be determined as related to the segment of closed-caption text. For example, this may be an article from a magazine that originally printed on a second date, such as a date three days after the weekly show aired. The title may be "Actor #1, Actor #2 plan summer wedding in Paris". An extraction of terms from an external source may yield the term "summer wedding" even though it is not present in the segment of closed-caption text. The term "summer wedding" may be used to determine supplemental content that may be more related to the segment of closed-caption text. The extracted terms not present in the segment of closed-caption text may be more relevant to the segment of CC text.

Figure 10:
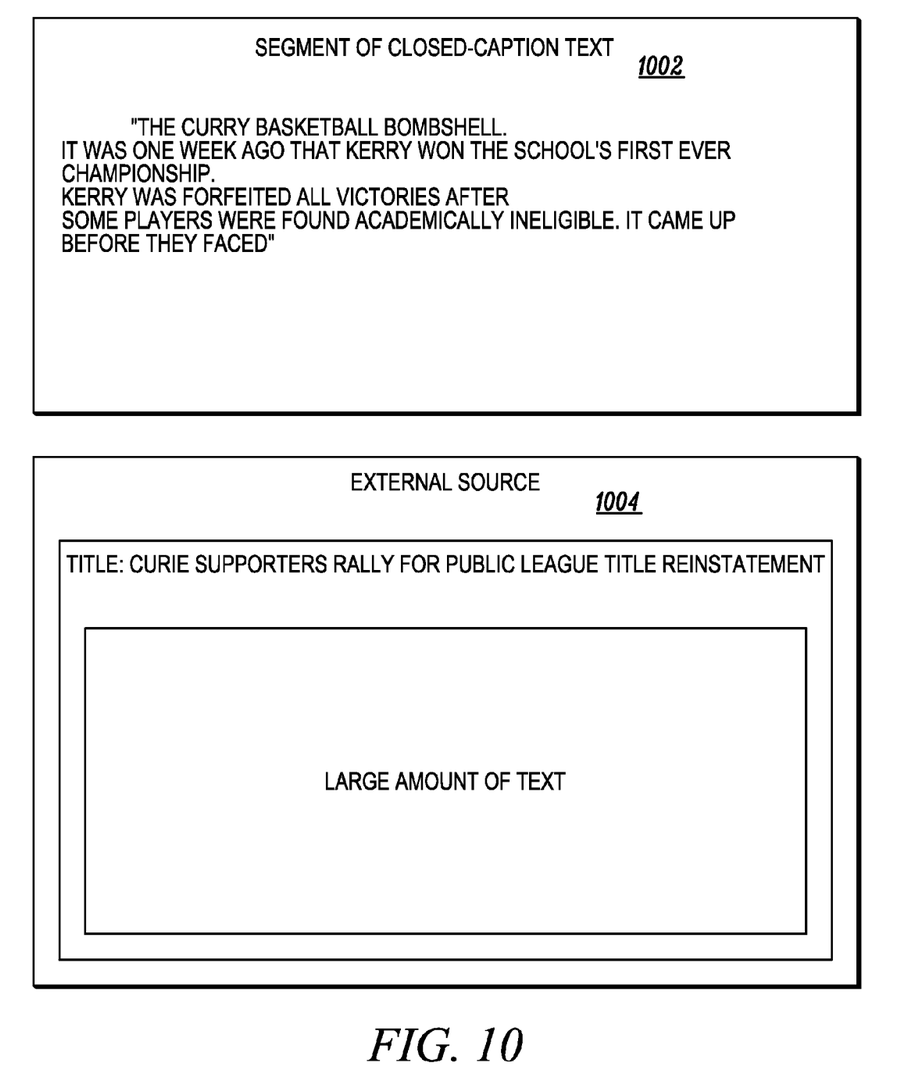
FIG. 10 shows an example of fixing a typographical error according to one embodiment.

Particular embodiments may also be used to fix typographical errors. FIG. 10 shows an example of fixing a typographical error according to one embodiment. A segment of closed-caption text is shown at 1002. The segment may be from a daily newscast for a certain city. The segment of closed-caption text includes typographical errors shown at 1004-1 of "Curry" and at 1004-2 of "Kerry". The correct term may be "Curie". An external source at 1006 may be determined to be related to the segment of closed-caption text. The external source may be from a newspaper article a day later than the date of the newscast. The title of the news article may be "Curie supporters rally for public league title reinstatement". Particular embodiments may determine the typographical errors in the segment of closed-caption text of "Curry" and "Kerry", and correct them as "Curie".

Enhancements

Information and decisions from previous segments of the closed-caption text may also be used to extract terms in conjunction with the external sources for a current segment of closed-caption text. In this case, the first set of information and second set of information determined for a segment from time T1 to T2 would be used by the CC processor 108 to determine the first set of information or the second set of information from a segment from time T3 to T4, where T3>T1.

In some embodiments, storage 110 contains multimedia content and the CC processor 108 can extract information from the multimedia content to assist with the extraction of terms. For example, an audio/video algorithm extracts information from the audio/video of the multimedia content from an external source. This extracted content can be used as an extracted term. For example, logo detection may determine the presence of a company logo in a video sequence and generate the text of "<company name>", wherein company name is the actual name of the company for the logo. A music identification algorithm may determine the presence of a song "<title #1>" by a band "<band name #1>" and generate the text "<band name #1>" and "<song title #1>" as text, where band name #1 is the actual name of the band who sang the song titled song title #1. Also, any object recognized in multiple frames of a video sequence may be used to generate words representing the objects. Speaker recognition can also be used to generate a speaker name as text. Sound recognition can be used to generate the emitter of the sound as text.

In some embodiments, storage 110 may contain multimedia content from the same video content that is associated with the segment of closed-caption text. But, the external source in storage 110 may have been aired at a previous time. CC processor 108 may extract audio/video/closed-caption/text on frames from the external source to assist in the extraction of terms.

In some embodiments, CC processor 108 may also extract information from the audio or video content that is associated with the closed-caption text. This extracted content can be used as an extracted term and be part of the first set of information. For example, logo detection may determine the presence of a company logo in a video sequence and generate the text of "<company name>", wherein company name is the actual name of the company for the logo. A music identification algorithm may determine the presence of a song "<title #1>" by a band "<band name #1>" and generate the text "<band name #1>" and "<song title #1>" as text, where band name #1 is the actual name of the band who sang the song titled song title #1. Also, any object recognized in multiple frames of a video sequence may be used to generate words representing the objects. Speaker recognition can also be used to generate a speaker name as text. Sound recognition can be used to generate the emitter of the sound as text. Text present in frames of the video content may also be extracted. More specifically, if the video content contains a scene in which a frame has an image of a sign with a word, CC processor 108 may extract the word from the image and add the word as a term even if the word is not present in the closed-captions text.

Accordingly, particular embodiments provide a way to efficiently determine supplemental content for segments of closed-caption text. The shortness of the segment of closed-caption text may affect the effectiveness of term extraction algorithms. By selecting external sources, which may be relevant to the segment of closed-caption text and also include more information, more relevant supplemental content may be determined.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   in a closed-caption processor disposed in a broadcast communication system, and communicatively coupled via the broadcast communication system to a plurality of client devices:
   receiving a set of external sources;
   determining terms extracted from each of the set of external sources;
   storing the terms for each of the set of external sources for use when the external source is selected; and
   automatically determining a segment of closed-caption text from closed-captions provided in video content available for viewing at the client devices by users;
   in the closed-caption processor, automatically selecting an external source from the set of external sources, the selecting based on a first set of information comprising a first set of terms extracted from the segment of closed-caption text, the external source including text not included in the segment of closed-caption text;
   in the closed-caption processor, generating a second set of information comprising a second set of terms extracted from the external source;
   in the closed-caption processor, determining supplemental content, the determining based on a result of a search using the second set of information; and
   via the broadcast communication system, outputting the supplemental content, from the closed-caption processor to a client device associated with a user, as being relevant to the segment of closed-caption text, the outputting based on the user viewing the segment of closed-caption text;
   wherein the supplemental content is outputted to the user while the video content corresponding to the segment of closed-caption text is being delivered to the user.

2. The method of claim 1, further comprising:
   determining a restriction based on the segment of closed-caption text; and
   selecting a subset of external sources from the set of external sources based on the restriction, wherein selecting the external source is from the subset of external sources.

3. The method of claim 2, wherein the restriction comprises one of a group consisting of a time associated with the video content, a time associated with the external source, a producer of the video content, a producer of the external source, a popularity of the video content, a popularity of the external source, an owner of the video content, an identity of the user, a genre of the external source, and a genre of the video content.

4. The method of claim 1, wherein:
   the first set of information is determined by extracting the first set of terms from the segment of closed-caption text, the first set of terms being extracted by a term extraction algorithm, and
   generating the second set of information comprises extracting the second set of terms from the external source, the second set of terms being extracted by the term extraction algorithm.

5. The method of claim 4, wherein the term extraction algorithm recognizes an additional term in the external source not found in the segment of closed-caption text based on analyzing the external source.

6. The method of claim 5, wherein the first set of terms and the second set of terms comprise key terms or named entities determined by the term extraction algorithm.

7. The method of claim 1, wherein the first set of information comprises all terms from the segment of closed-caption text.

8. A non-transitory computer-readable storage medium containing instructions that, when executed, control a closed-caption processor disposed in a broadcast communication system, and communicatively coupled via the broadcast communication system to a plurality of client devices, to be configured for:
   automatically determining a segment of closed-caption text from closed-captions provided in video content available for viewing by users;
   automatically selecting an external source from a set of external sources based on a first set of information comprising a first set of terms extracted from the segment of closed-caption text, the external source including text not included in the segment of closed-caption text, wherein selecting the external source comprises:
   determining terms extracted from a first external source,
   determining terms extracted from a second external source, and
   determining which of the terms extracted from the first external source and the second external source is to be used as the second set of information based on a similarity of the terms extracted from the first external source and the second external source to the first set of information;

generating a second set of information comprising a
  second set of terms extracted from the external source;
determining supplemental content, the determining based
  on a result of a search using the second set of information; and
outputting the supplemental content, via the broadcast
  communication system, to a client device associated
  with a user, as being relevant to the segment of closed-caption text, the outputting based on the user viewing
  the segment of closed-caption text;
wherein the supplemental content is outputted to the user
  while the video content corresponding to the segment
  of closed-caption text is being delivered to the user.

9. A method comprising:
  in a closed-caption processor disposed in a broadcast
    communication system, and communicatively coupled
    via the broadcast communication system to a plurality
    of client devices, automatically determining a segment
    of closed-caption text from closed-captions provided in
    video content available for viewing at the client devices
    by users;
  in the closed-caption processor, automatically selecting
    an external source from a set of external sources, the
    selecting based on a first set of information comprising
    a first set of terms extracted from the segment of
    closed-caption text, the external source including text
    not included in the segment of closed-caption text,
    wherein selecting the external source comprises:
    determining terms extracted from a first external
      source,
    determining terms extracted from a second external
      source, and
    determining which of the terms extracted from the first
      external source and the second external source is to
      be used as the second set of information based on a
      similarity of the terms extracted from the first external source and the second external source to the first
      set of information;
  in the closed-caption processor, generating a second set of
    information comprising a second set of terms extracted
    from the external source;
  in the closed-caption processor, determining supplemental content, the determining based on a result of a
    search using the second set of information; and
  via the broadcast communication system, outputting the
    supplemental content, from the closed-caption processor to a client device associated with a user, as being
    relevant to the segment of closed-caption text, the
    outputting based on the user viewing the segment of
    closed-caption text;
  wherein the supplemental content is outputted to the user
    while the video content corresponding to the segment
    of closed-caption text is being delivered to the user.

10. The method of claim 1, wherein the segment of closed-caption text is received while the video content is being sent to the user.

11. The method of claim 1, wherein determining the supplemental content comprises:
  submitting the second set of information to a search engine to determine search results, wherein at least a portion of the search results are output as the supplemental content.

12. The method of claim 11, wherein at least a portion of the first set of information is submitted to the search engine to determine the search results.

13. The method of claim 1, wherein the supplemental content comprises an identifier or link to the external source.

14. The method of claim 1, wherein the second set of information is used for generating a subsequent second set of information for a subsequent segment of closed-caption text.

15. The method of claim 1, wherein the second set of information includes multimedia content extracted from video content of the external source.

16. The method of claim 1, wherein the first set of information includes information extracted from the video content associated with the closed-caption text.

17. A non-transitory computer-readable storage medium containing instructions that, when executed, control a closed-caption processor disposed in a broadcast communication system, and communicatively coupled via the broadcast communication system to a plurality of client devices, to be configured for:
  receiving a set of external sources;
  determining terms extracted from each of the set of
    external sources;
  storing the terms for each of the set of external sources for
    use when the external source is selected;
  automatically determining a segment of closed-caption
    text from closed-captions provided in video content
    available for viewing by users;
  automatically selecting an external source from the set of
    external sources based on a first set of information
    comprising a first set of terms extracted from the
    segment of closed-caption text, the external source
    including text not included in the segment of closed-caption text;
  generating a second set of information comprising a
    second set of terms extracted from the external source;
  determining supplemental content, the determining based
    on a result of a search using the second set of information; and
  outputting the supplemental content, via the broadcast
    communication system, to a client device associated
    with a user, as being relevant to the segment of closed-caption text, the outputting based on the user viewing
    the segment of closed-caption text;
  wherein the supplemental content is outputted to the user
    while the video content corresponding to the segment
    of closed-caption text is being delivered to the user.

18. The non-transitory computer-readable storage medium of claim 17, further configured for:
  determining a restriction based on the segment of closed-caption text; and
  selecting a subset of external sources from the set of
    external sources based on the restriction, wherein
    selecting the external source is from the subset of
    external sources.

19. An apparatus comprising:
  one or more closed-caption computer processors disposed
    in a broadcast communication system, and communicatively coupled via the broadcast communication system to a plurality of client devices; and
  a non-transitory computer-readable storage medium comprising instructions that, when executed, control the
    one or more closed-caption computer processors to be
    configured for:
    receiving a set of external sources;
    determining terms extracted from each of the set of
      external sources;
    storing the terms for each of the set of external sources
      for use when the external source is selected;

automatically determining a segment of closed-caption text from closed-captions provided in video content available for viewing by users;

automatically selecting an external source from the set of external sources based on a first set of information comprising a first set of terms extracted from the segment of closed-caption text, the external source including text not included in the segment of closed-caption text;

generating a second set of information comprising a second set of terms extracted from the external source;

determining supplemental content, the determining based on a result of a search using the second set of information; and outputting the supplemental content, via the broadcast communication system, to a client device associated with a user, as being relevant to the segment of closed-caption text, the outputting based on the user viewing the segment of closed-caption text;

wherein the supplemental content is outputted to the user while the video content corresponding to the segment of closed-caption text is being delivered to the user.

20. An apparatus comprising:

one or more closed-caption computer processors disposed in a broadcast communication system, and communicatively coupled via the broadcast communication system to a plurality of client devices; and a non-transitory computer-readable storage medium comprising instructions that, when executed, control the one or more closed-caption computer processors to be configured for:

automatically determining a segment of closed-caption text from closed-captions provided in video content available for viewing by users;

automatically selecting an external source from a set of external sources based on a first set of information comprising a first set of terms extracted from the segment of closed-caption text, the external source including text not included in the segment of closed-caption text, wherein selecting the external source comprises:

determining terms extracted from a first external source, determining terms extracted from a second external source, and determining which of the terms extracted from the first external source and the second external source is to be used as the second set of information based on a similarity of the terms extracted from the first external source and the second external source to the first set of information;

generating a second set of information comprising a second set of terms extracted from the external source;

determining supplemental content, the determining based on a result of a search using the second set of information; and outputting the supplemental content, via the broadcast communication system, to a client device associated with a user, as being relevant to the segment of closed-caption text, the outputting based on the user viewing the segment of closed-caption text;

wherein the supplemental content is outputted to the user while the video content corresponding to the segment of closed-caption text is being delivered to the user.

* * * * *